US012661772B2

(12) United States Patent
Chen et al.

(10) Patent No.: US 12,661,772 B2
(45) Date of Patent: Jun. 23, 2026

(54) IMPACT TOOL

(71) Applicant: Nanjing Chervon Industry Co., Ltd., Nanjing (CN)

(72) Inventors: Shuai Chen, Nanjing (CN); Hongtao Ke, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/098,417

(22) Filed: Apr. 2, 2025

(65) Prior Publication Data

US 2025/0326100 A1 Oct. 23, 2025

(30) Foreign Application Priority Data

Apr. 22, 2024 (CN) ......................... 202410488053.6

(51) Int. Cl.
*B25F 5/00* (2006.01)
*B25B 21/02* (2006.01)
*B25B 23/00* (2006.01)

(52) U.S. Cl.
CPC .............. *B25F 5/001* (2013.01); *B25B 21/02* (2013.01); *B25B 23/0035* (2013.01)

(58) Field of Classification Search
CPC ...... B25F 5/001; B25B 21/02; B25B 23/0035
See application file for complete search history.

(56) References Cited

U.S. PATENT DOCUMENTS 3,212,246 A 10/1965 Duke
9,956,849 B2 5/2018 French
11,780,060 B2 * 10/2023 Kusumoto .............. B25B 21/02
81/464
11,992,920 B2 * 5/2024 Tamura ................... B25B 21/02
2022/0111497 A1 * 4/2022 Sano ....................... B25B 21/02
2023/0398662 A1 * 12/2023 Aoki ....................... B25B 21/02
2023/0398664 A1 * 12/2023 Honda .................. B25B 21/026
(Continued)

FOREIGN PATENT DOCUMENTS

WO 2022094788 A1 5/2022

OTHER PUBLICATIONS

Office Action from Australian application No. 2025202400, dated Jan. 29, 2026, 4 pp.

(Continued)

*Primary Examiner* — Michelle Lopez
(74) *Attorney, Agent, or Firm* — Greenberg Traurig, LLP

(57) ABSTRACT

An impact tool includes: an electric motor including a drive shaft rotating about a first axis; an impact member configured to be driven by the electric motor; an output mechanism configured to be provided with an impact force by the impact member; a transmission mechanism disposed between the electric motor and the impact member and transmitting torque outputted by the drive shaft to the impact member; and a power supply configured to supply electrical energy to the impact tool. The output mechanism includes: a first output shaft driven by an impact member to rotate, a second output shaft connected to the first output shaft and retained at the front-most end of the impact tool to be mounted with a tool accessory. The front end surface of the first output shaft is configured as a force-bearing region bearing an impact reaction force from the tool accessory.

19 Claims, 9 Drawing Sheets

(56) References Cited

U.S. PATENT DOCUMENTS

| | | | | |
|---|---|---|---|---|
| 2024/0075595 | A1 | 3/2024 | Eardley | |
| 2024/0075604 | A1 | 3/2024 | Amend | |
| 2024/0342888 | A1* | 10/2024 | Breitbach | B25D 17/06 |

OTHER PUBLICATIONS

"M18 Fuel Mower should include a fan—(Mower Mods) : r/MilwaukeeTool", Aug. 29, 2023 (Aug. 29, 2023), XP093270003, Retrieved from the Internet: URL:https://www.reddit.com/r/MilwaukeeTool/comments/164kom3/m18_fuel_mower_should_include_a_fan_mower_mods/ [retrieved on Apr. 14, 2025].

Office Action from EP application No. 24217322.7, dated Nov. 17, 2025, 5 pp.

* cited by examiner

IMPACT TOOL

RELATED APPLICATION INFORMATION

This application claims the benefit under 35 U.S.C. § 119(a) of Chinese Patent Application No. 202410488053.6, filed on Apr. 22, 2024, which application is incorporated herein by reference in its entirety.

TECHNICAL FIELD

The present application relates to the field of power tools and, in particular, to a power tool.

BACKGROUND

An impact tool refers to a tool capable of outputting rotational movements at a certain impact frequency. Common impact tools include an impact wrench, an impact screwdriver, an impact drill, and the like. The impact wrench is typically used for screwing bolts, nuts, and the like. The impact screwdriver is typically used for loosening or tightening screws and the like. The impact drill is typically used for drilling holes through impact.

To output rotational movements at a certain impact frequency, the impact tool typically includes an output assembly for outputting a rotational force and an impact member for cyclically impacting the output assembly.

In a related technical product, an output shaft in an output assembly is integrated. When the impact tool works, a significant stress concentration point always exists at the square shaft at the front end of the output shaft, which causes the square shaft to be prone to break off from the output shaft. As a result, the life of the output shaft and the life of the impact tool are shortened.

This part provides background information related to the present application, and the background information is not necessarily the existing art.

SUMMARY

An impact tool includes an electric motor, an impact member, an output mechanism, a transmission mechanism, and a power supply. The electric motor includes a drive shaft rotating about a first axis. The impact member is configured to be driven by the electric motor. The output mechanism is configured to be provided with an impact force by the impact member. The transmission mechanism is disposed between the electric motor and the impact member and transmits torque outputted by the drive shaft to the impact member. The power supply is configured to supply electrical energy to the impact tool. The output mechanism includes: a first output shaft configured to rotate in response to receiving an impact force along a rotation direction of the impact member; and a second output shaft connected to the first output shaft and retained at the front-most end of the impact tool to be mounted with a tool accessory. The front end surface of the first output shaft is configured as a force-bearing region bearing an impact reaction force from the tool accessory.

In some examples, a partially nested region exists between the first output shaft and the second output shaft, and the length of the nested region is greater than or equal to 3 mm.

In some examples, the maximum radial length of the nested region is greater than or equal to 6 mm and less than or equal to 45 mm.

In some examples, the length of the nested region is greater than or equal to 8 mm.

In some examples, the front end surface of the first output shaft is formed with a first polygonal opening, the shape of at least the rear end of the second output shaft matches the shape of the first polygonal opening, and the rear end of the second output shaft is accommodated in the first polygonal opening.

In some examples, the first polygonal opening is a quadrilateral opening, and a diagonal of the quadrilateral opening is substantially parallel or substantially perpendicular to the axis of the first output shaft.

In some examples, at least the front end of the second output shaft is configured as a shaft in the shape of a square column so as to be mounted with the tool accessory.

In some examples, the impact tool further includes a connector, where the connector is configured to connect the first output shaft to the second output shaft.

In some examples, a buffer is disposed between the connector and the first output shaft.

In some examples, the connector includes a screw.

In some examples, the front end surface of the first output shaft is in contact with the rear end surface of the tool accessory mounted on the second output shaft.

In some examples, at least part of the surface layer of the first output shaft and/or the second output shaft has a first hardness, and the core region of the first output shaft and/or the second output shaft has a second hardness, where the first hardness is greater than the second hardness.

In some examples, the intermediate region between the surface layer and the core region has a third hardness, where the third hardness is less than the second hardness.

In some examples, an axial positioning portion is disposed on the second output shaft to axially position the tool accessory.

In some examples, the size of the second output shaft is greater than or equal to one-quarter inch and less than or equal to two and a half inches.

In some examples, an impact tool includes: an electric motor including a drive shaft rotating about a first axis; an impact member configured to be driven by the electric motor; an output mechanism configured to be provided with an impact force by the impact member; a transmission mechanism disposed between the electric motor and the impact member and transmitting torque outputted by the drive shaft to the impact member; and a power supply configured to supply electrical energy to the impact tool. The output mechanism includes: a first output shaft configured to rotate in response to receiving an impact force along a rotation direction of the impact member; and a second output shaft connected to the first output shaft and retained at the front-most end of the impact tool to be mounted with a tool accessory. An axial partially nested region exists between the first output shaft and the second output shaft, and the length of the nested region is greater than or equal to 3 mm.

In some examples, the maximum radial length of the nested region is greater than or equal to 6 mm and less than or equal to 45 mm.

In some examples, an axial positioning portion is disposed on the second output shaft to axially position the tool accessory.

In some examples, the hardness of the surface of the first output shaft and/or the second output shaft is greater than the hardness of the core of the first output shaft and/or the second output shaft.

In some examples, the hardness of the intermediate region between the surface and the core is less than the hardness of the core.

DETAILED DESCRIPTION

Figure 1:
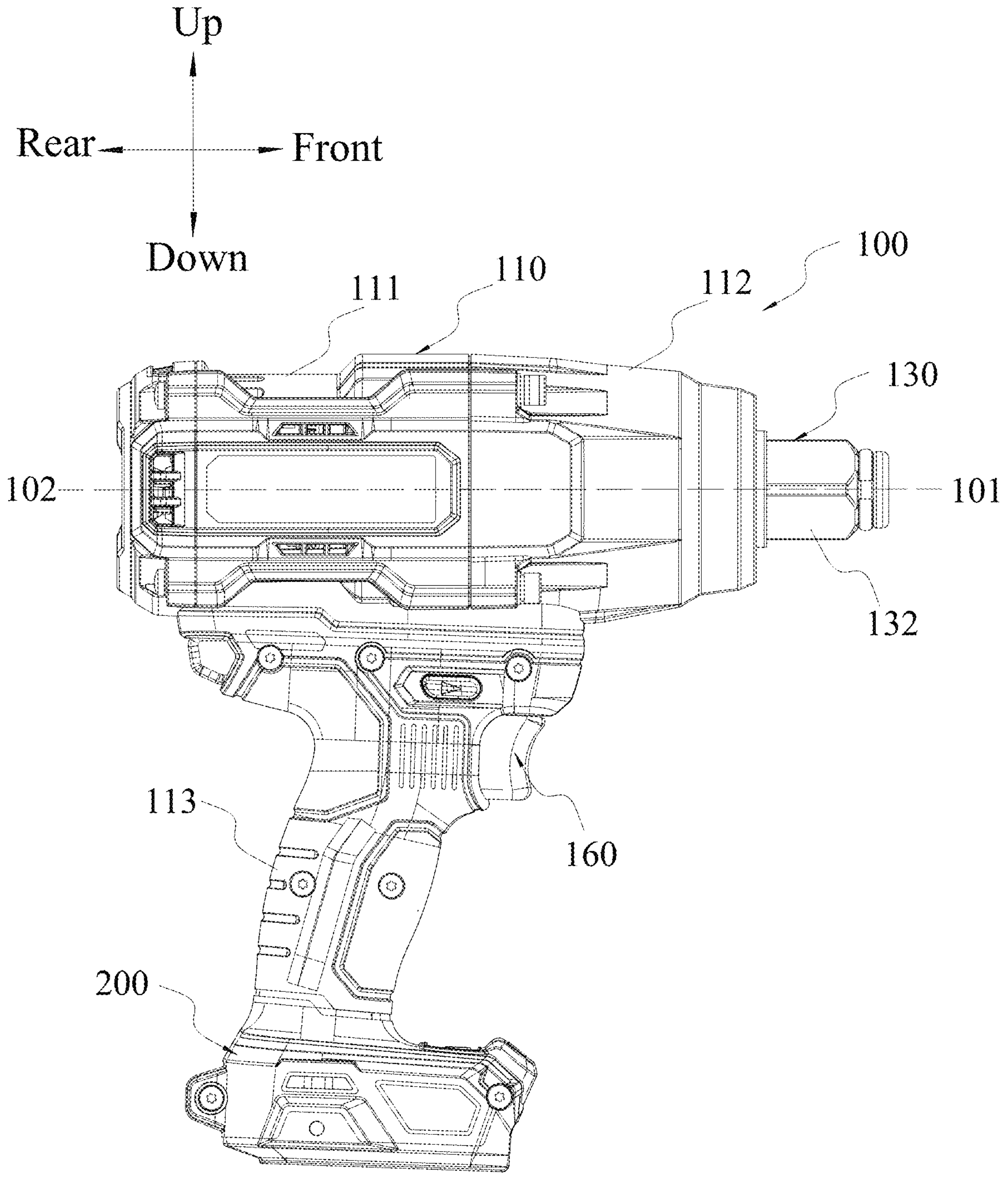
FIG. 1 is a side view of an impact wrench according to an example.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

To clearly illustrate technical solutions of the present application, an upper side, a lower side, a front side, and a rear side shown in FIG. 1 are further defined.

Figure 2:
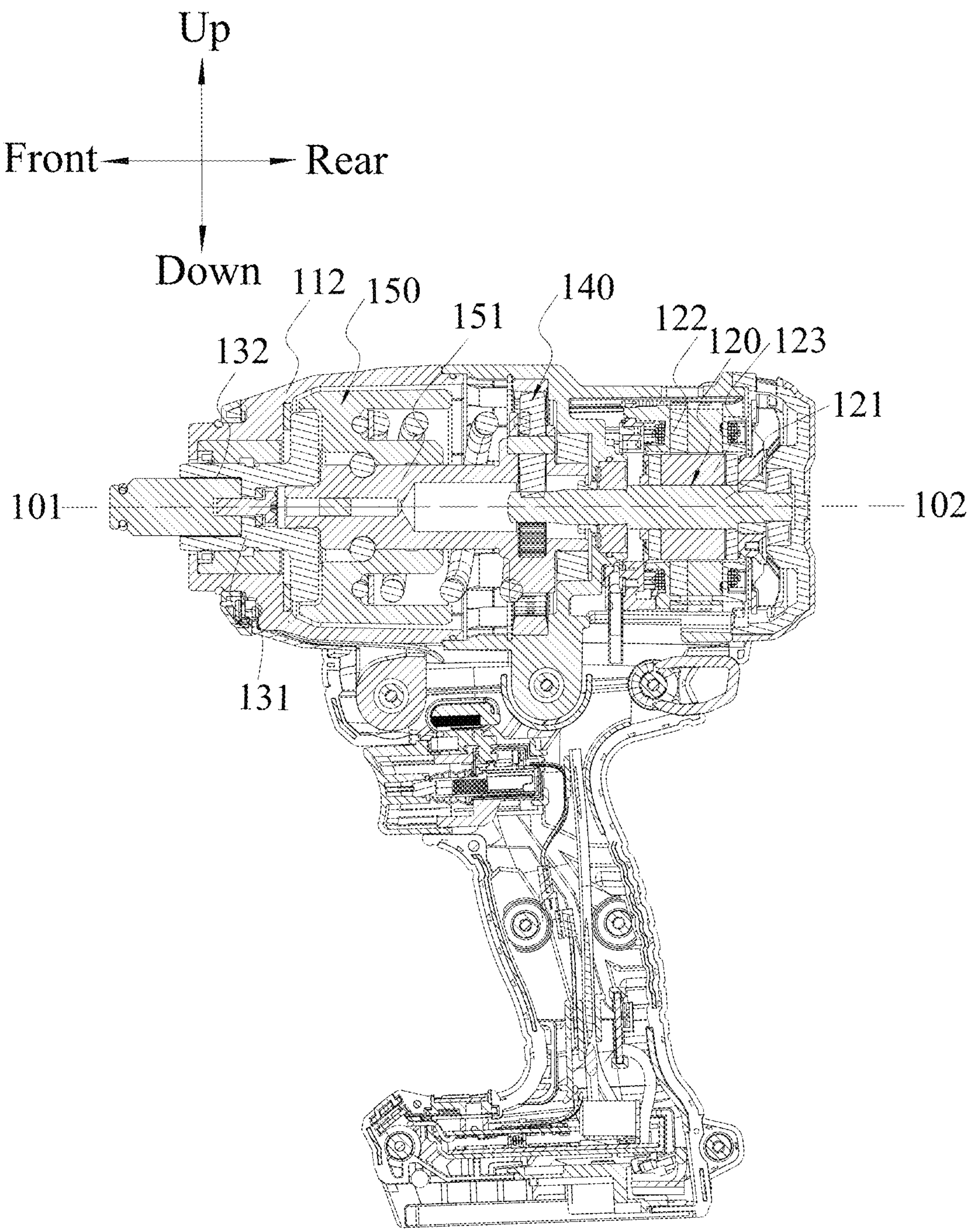
FIG. 2 is a sectional view of the impact wrench in FIG. 1.

FIGS. 1 and 2 show an impact tool in an example of the present application. In this example, the impact tool is an impact wrench 100. It is to be understood that the impact tool is a rotary tool. In other alternative examples, different working accessories may be mounted to the rotary tool so that with these different working accessories, the impact tool may be, for example, an impact screwdriver or an impact drill.

FIG. 1 shows the impact wrench 100 in the example of the present application, where the impact wrench 100 includes a power supply. The power supply is configured to supply electrical energy to the impact wrench 100. In this example, the power supply includes a direct current power supply 200. For example, the direct current power supply 200 is a battery pack. Corresponding components in the impact wrench 100 are powered by the battery pack cooperating with a corresponding power supply circuit. It is to be understood by those skilled in the art that the power supply is not limited to the battery pack, and the corresponding components in the machine may be powered through mains electricity or an alternating current power supply in cooperation with corresponding rectifier, filter, and voltage regulation circuits. In this example, the direct current power supply 200 is specifically configured as the battery pack. The battery pack 200 is used below instead of the direct current power supply, which is not intended to limit the present application.

As shown in FIGS. 1 and 2, the impact wrench 100 includes a housing 110, an electric motor 120, an output mechanism 130, a transmission mechanism 140, and an impact member 150. The electric motor 120 includes a drive shaft 121 rotating about a first axis 101. The electric motor 120 includes a stator assembly 122 and a rotor assembly 123. The rotor assembly 123 is formed with or connected to the drive shaft 121 rotating about the first axis 101. In this example, the electric motor 120 is a brushless inrunner. In other alternative examples, the electric motor 120 is a brushless outrunner. In the inrunner, the stator assembly 122 is sleeved on the outer side of the rotor assembly 123. In the outrunner, the rotor assembly 123 is sleeved on the outer side of the stator assembly 122. In this example, the brushless motor is configured as a three-phase brushless motor. It is to be understood that the electric motor is not limited to the three-phase brushless motor and may be another type of direct current motor. The above does not affect the substance of the present application.

The housing 110 includes an electric motor housing 111 for accommodating the electric motor 120 and an output housing 112 for accommodating at least part of an output mechanism 130. The output housing 112 is connected to the front end of the electric motor housing 111. The housing 110 is further formed with or connected to a grip 113 for a user to operate. The grip 113 and the electric motor housing 111 form a T-shaped or L-shaped structure, facilitating the hold and operation of the user. The battery pack 200 is connected to an end of the grip 113. The battery pack 200 is detachably connected to the grip 113.

As shown in FIG. 1, the impact wrench 100 further includes a switch 160. The switch 160 is a trigger switch. The trigger switch is disposed on the grip 113 to be operated by the user to control the impact wrench 100 to be on or off.

As shown in FIGS. 1 to 4, the output mechanism 130 includes an output shaft for connecting a working accessory and driving the working accessory to rotate. The output shaft includes a first output shaft 131 and a second output shaft 132. The first output shaft 131 is configured to rotate in response to receiving an impact force along a rotation direction of the impact member 150. The second output shaft 132 is connected to the first output shaft 131 and retained at the front-most end of the impact tool 100 to be mounted with a tool accessory 300. The tool accessory 300 is a clamping assembly that can clamp different working accessories such as a bit, a drill bit, and a socket to implement corresponding functions.

In some examples, the first output shaft 131 is also referred to as a hammer anvil. In the present application, the hammer anvil is specifically referred to as the first output shaft 131 for a specific illustration. The first output shaft 131 includes a body 1311 and a pair of second end teeth 1312. The second end teeth 1312 are symmetrically provided on the body 1311 along the radial direction of the first output shaft 131 and protrude from the body 1311. The maximum radial length of each of the second end teeth 1312 is greater than or equal to 30 mm, and the maximum radial length of the first output shaft 131 is greater than or equal to 30 mm. Optionally, the maximum radial length of each of the second end teeth 1312 is 32 mm. Optionally, the maximum radial length of each of the second end teeth 1312 is 32.8 mm. Optionally, the maximum radial length of each of the second end teeth 1312 is 33.5 mm. Optionally, the maximum radial length of each of the second end teeth 1312 is 34.3 mm.

The first output shaft 131 and the second output shaft 132 are used for outputting power and rotate about an output axis 102. In this example, the first axis 101 coincides with the output axis 102. In other alternative examples, an angle of a certain degree exists between the output axis 102 and the first axis 101. In other alternative examples, the first axis 101 and the output axis 102 are parallel to each other but do not coincide with each other.

Figure 3:
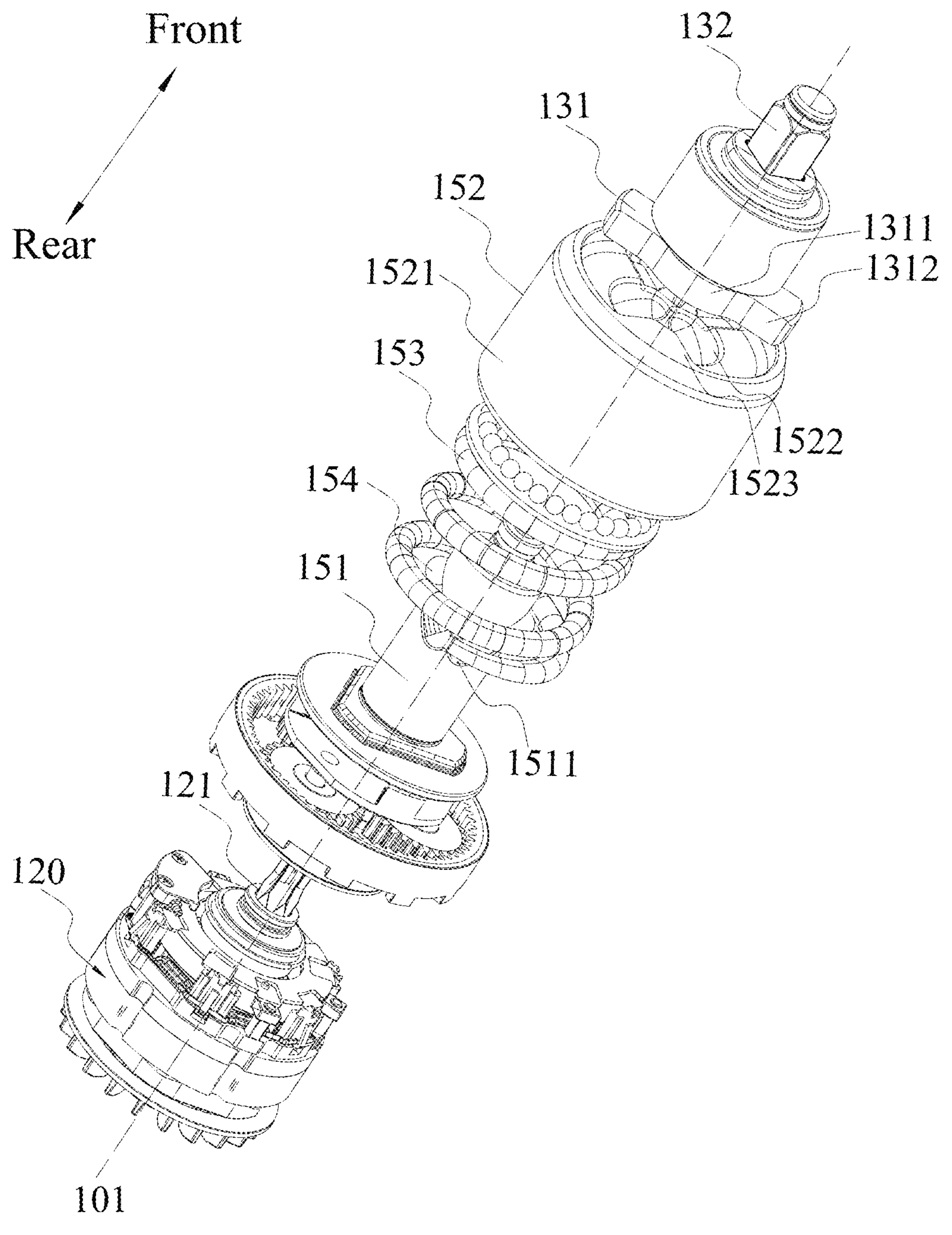
FIG. 3 is a perspective exploded view of an electric motor in FIG. 1.
Figure 4:
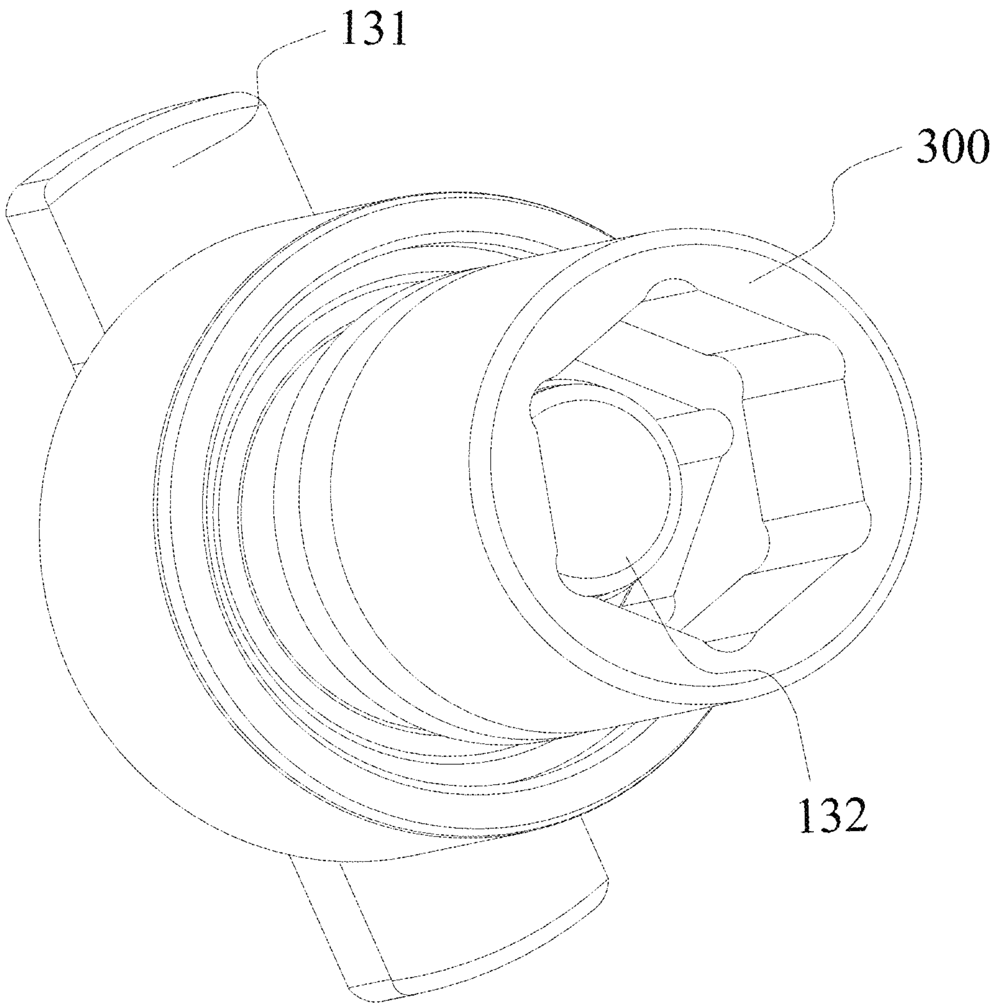
FIG. 4 is a perspective view showing that a first output shaft and a second output shaft in FIG. 1 are connected to a tool accessory.

As shown in FIGS. 2 and 3, the impact member 150 is driven by the electric motor 120. The impact member 150 is used for providing an impact force for the output mechanism 130. The impact member 150 includes a main shaft 151, an impact block 152 sleeved on the circumference of the main shaft 151, and an elastic element 153 disposed at the rear end of the impact block 152.

The impact block 152 is driven to rotate by the drive shaft 121. The body 1311 of the first output shaft 131 mates with the impact block 152 and is impacted by the impact block 152. The main shaft 151 connects the impact block 152 to the drive shaft 121. In some examples, the drive shaft 121 drives the main shaft 151, and the main shaft 151 drives the impact block 152 to rotate.

The impact block 152 includes an impact block body 1521. A pair of first end teeth 1523 are symmetrically provided on and protrude from the front end face of the impact block body 1521 radially. A pair of second end teeth 1312 are symmetrically provided on and protrude from the rear end surface of the body 1311 opposite to the impact block 152 radially. The output mechanism 130 extends out of the output housing 112. The impact block 152 is supported on the main shaft 151 to rotate integrally with the main shaft 151 and is slidable back and forth relative to the main shaft 151 in the axial direction of the main shaft. In some examples, the axis of the main shaft 151 coincides with the axis of the drive shaft 121. Therefore, the impact block 152 slides and rotates back and forth along the direction of the first axis 101 relative to the main shaft 151. In some examples, the axis of the main shaft 151 may be parallel to the axis of the drive shaft 121 but does not coincide with the axis of the drive shaft 121. Alternatively, an included angle of a certain degree exists between the axis of the main shaft 151 and the axis of the drive shaft 121.

The elastic element 153 provides a force for the impact block 152 to approach the first output shaft 131. Optionally, the elastic element 153 may be a coil spring.

In a working process of the impact wrench 100, the impact block 152 moves back and forth along the direction of the first axis 101 at a predetermined stroke relative to the main shaft 151 while rotating integrally with the main shaft 151. A pair of first ball grooves 1522 that open forward and extend backward along a front and rear direction are provided on the front end surface of the impact block body 1521. A pair of V-shaped second ball grooves 1511 are formed on the outer surface of the main shaft 151. The first ball grooves 1522 and the second ball grooves 1511 each have semicircular groove bottoms. The impact assembly 150 further includes a rolling ball 154. The rolling ball 154 straddles the first ball grooves 1522 and the second ball grooves 1511 so that the impact block 152 and the main shaft 151 are connected to each other and move together. Optionally, the rolling ball 154 may be a steel ball.

In the related art, the impact block 152 and the main shaft 151 are separately provided with inwardly recessed V-shaped grooves to form ball channels together, and the rolling ball 154 is disposed between the impact block 152 and the main shaft 151 and embedded into the ball channels. Thus, the main shaft 151 can drive, through the rolling ball 154, the impact block 152 to rotate, and the impact block 152 mates with the first output shaft 131 to drive the first output shaft 131 to rotate so as to further drive the output mechanism 130 to rotate.

When the impact wrench 100 works with no load, the impact member 150 does not impact and plays a role in transmitting the rotation of the electric motor 12 to the output mechanism 130. When a load is applied to the impact wrench 100, the rotation of the output mechanism 130 is blocked. The output mechanism 130 may reduce a rotational speed or may completely stop rotating due to a different magnitude of the load. When the output mechanism 130 completely stops rotating, the first output shaft 131 also stops rotating. Due to the limitation of the first output shaft 131 on the impact block 152 in a circumferential direction, the impact block 152 also stops rotating. However, the main shaft 151 continues rotating such that the rolling ball 154 is pressed to move along the ball channels, thereby driving the impact block 152 to be displaced backward along the axis of the main shaft 151. At the same time, the elastic element 153 is pressed until the first output shaft 131 is completely separated from the impact block 152. The main shaft 151 drives the impact block 152 to rotate at a certain rotational speed, and the elastic element 153 springs back along the axial direction. The relative rotational speed between the impact block 152 and the first output shaft 131 is the rotational speed of the impact block 152. When the impact block 152 rotates to be in contact with the first output shaft 131, the impact block 152 applies an impact force to the first output shaft 131. Under the action of this impact force, the output mechanism 130 overcomes the load and continues rotating by a certain angle, and then the output mechanism 130 stops rotating again. The preceding process is repeated. Since an impact frequency is high enough, a relatively continuous impact force is applied to the output mechanism 130 so that the working accessory works continuously.

The transmission mechanism 140 is configured to transmit torque outputted from the drive shaft 121 to the output mechanism 130. In this example, the transmission mechanism 140 is disposed between the electric motor 120 and the impact member 150 and is used for transmitting power between the drive shaft 121 and the main shaft 151. That is, the transmission mechanism 140 is used for transmitting the torque outputted by the drive shaft 121 to the impact member 150 and then to the output mechanism 130. In this example, the transmission mechanism 140 is decelerated by a planet gear. The working principle according to which a planet gear performs deceleration and the deceleration implemented by the transmission mechanism have been completely disclosed to those skilled in the art. Therefore, the detailed description is omitted herein for the brevity of the specification.

Figure 5:
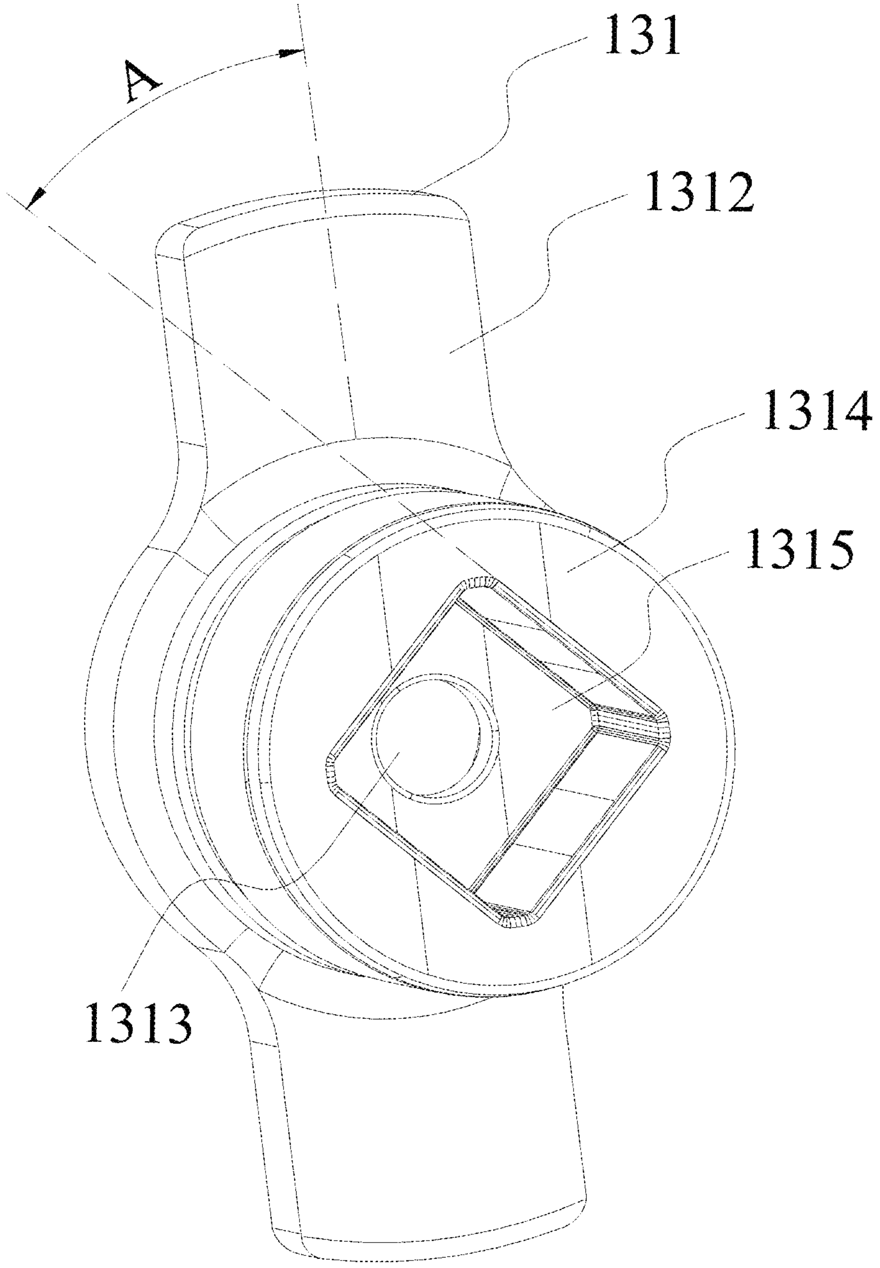
FIG. 5 is a perspective view of the first output shaft in FIG. 4.
Figure 6:
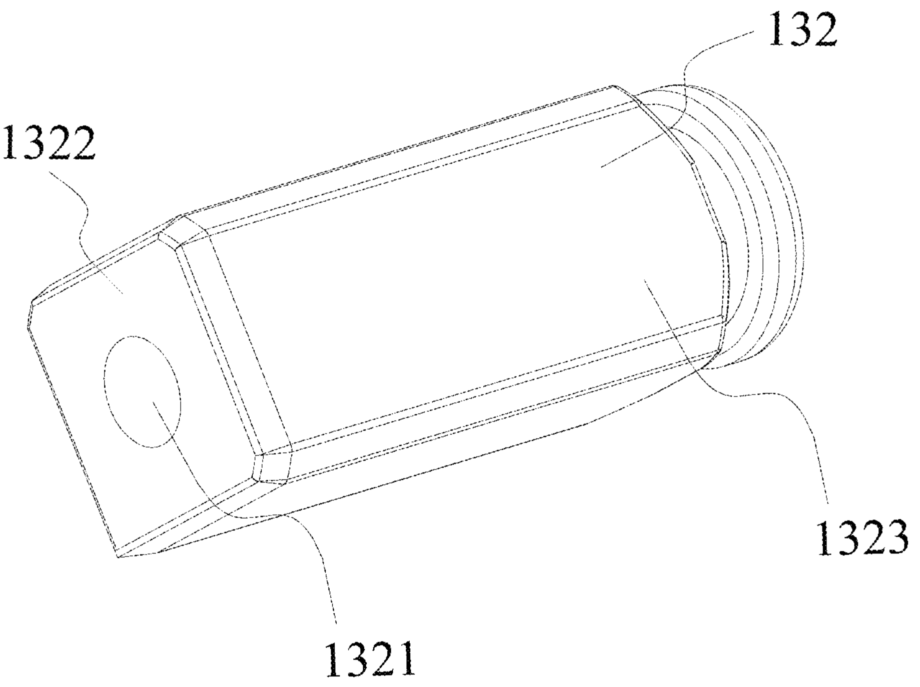
FIG. 6 is a perspective view of the second output shaft in FIG. 4.
Figure 7:
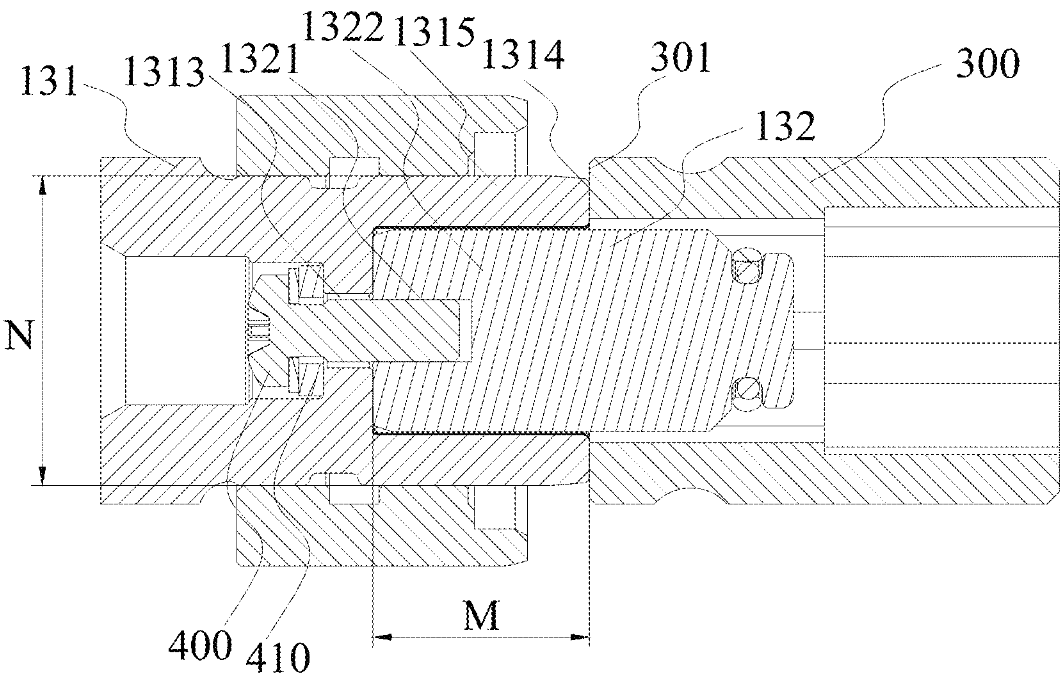
FIG. 7 is a sectional view of FIG. 4.

In some examples, as shown in FIGS. 5 to 7, the first output shaft 131 and the second output shaft 132 are disposed separately. The impact wrench 100 further includes a connector 400. The connector 400 is configured to connect the first output shaft 131 to the second output shaft 132. Optionally, the first output shaft 131 includes a first hole 1313 provided on the body 1311 of the first output shaft 131. The second output shaft 132 includes a second hole 1321 corresponding to the first hole 1313. The second hole 1321 and the first hole 1313 each match the connector 400. Optionally, the connector 400 sequentially passes through the first hole 1313 and the second hole 1321 to connect the first output shaft 131 to the second output shaft 132. Thus, the first output shaft 131 and the second output shaft 132 are axially locked, thereby implementing a reliable connection between the first output shaft 131 and the second output shaft 132. Optionally, the first output shaft 131 may have an interference fit with the second output shaft 132. Optionally, the first output shaft 131 may have a transition fit with the second output shaft 132.

Optionally, the connector 400 may be a screw. The first output shaft 131 and the second output shaft 132 are connected to each other through the screw, which is simple, easy to implement, and less expensive. Optionally, the connector 400 may include an elastic protruding feature and a recess or hole matching the elastic protruding feature. The elastic protruding feature mates with the recess or hole such that the connection is performed. Optionally, the connector 400 may be an insert pin structure. Optionally, the connector 400 may include a snap ring and a snap groove. The snap ring mates with the snap groove such that the connection is implemented. Optionally, the connection manner of the connector 400 may be an interference connection. Optionally, the connector 400 may be an elastic member. The interference connection is performed through the elastic member. Additionally, the connector 400 may be any other structure capable of performing a connection function, which is not limited in the present application. In some examples, as shown in FIG. 7, a buffer 410 is disposed between the connector 400 and the first output shaft 131. Thus, the vibration of the connector 400 is damped axially and radially through the buffer 410, thereby preventing the connector 400 from breaking when the impact member 150 impacts the first output shaft 131. Optionally, the buffer 410 may be an elastic gasket. Optionally, the buffer 410 may be any other component capable of playing a buffering role, which is not limited in the present application.

In some examples, when the first output shaft 131 and the second output shaft 132 are disposed separately, the front end surface 1314 of the first output shaft 131 is in contact with the rear end surface 301 of the tool accessory 300 mounted on the second output shaft 132. The area of the front end surface 1314 is greater than or equal to 34 $mm^2$. Optionally, the area of the front end surface 1314 may be 34.5 $mm^2$. Optionally, the area of the front end surface 1314 may be 35 $mm^2$. Optionally, the area of the front end surface 1314 may be 36 $mm^2$. The front end surface 1314 of the first output shaft 131 is configured as a force-bearing region bearing an impact reaction force from the tool accessory 300. When the impact wrench 100 works, the tool accessory 300 impacts outward to output a force and is subjected to an external reaction force. In this case, the tool accessory 300 outputs a reaction force to the front end surface 1314 of the first output shaft 131, enabling the reaction force to be evenly distributed across the entire front end surface 1314. In this case, the first output shaft 131 is less prone to be damaged when subjected to the reaction force. Moreover, the front end surface 1314 has a relatively large area so that the first output shaft 131 is further less prone to be damaged when subjected to the reaction force.

Figure 8:
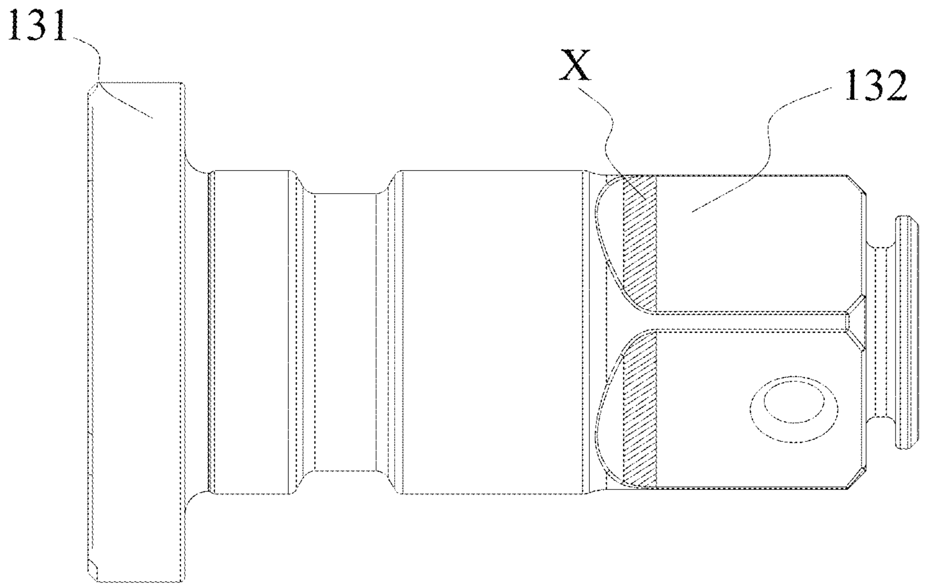
FIG. 8 is a side view of an integrated output shaft according to an example.

However, when the first output shaft 131 and the second output shaft 132 are integrally formed originally, the reaction force outputted by the tool accessory 300 acts on the joint X between the first output shaft 131 and the second output shaft 132, as shown in FIG. 8. The joint X specifically refers to a circular connection line that radially surrounds the output shaft, that is, the shaded region in FIG. 8. As a result, a force-bearing area is relatively small, making the joint X prone to break. Accordingly, the output shaft is broken. Specifically, the second output shaft 132 and the first output shaft 131 break apart from each other, leading to a shortened service life of the impact wrench 100. In contrast, in the present application, the first output shaft 131 and the second output shaft 132 are disposed separately so that the reactive force outputted by the tool accessory 300 acts on the entire front end surface 1314. Thus, the risk is avoided that the output shaft breaks, and the service lives of the first output shaft 131, the second output shaft 132, and the impact wrench 100 are prolonged.

In some examples, the front surface 1314 of the first output shaft 131 is formed with a first polygonal opening 1315. The shape of at least the rear end 1322 of the second output shaft 132 matches the shape of the first polygonal opening 1315 so that the rear end 1322 of the second output shaft 132 can be accommodated in the first polygonal opening 1315. Optionally, the shape of the first polygonal opening 1315 may be a quadrilateral as shown in FIG. 5. Optionally, the shape of the first polygonal opening 1315 may be a pentagon. Optionally, the shape of the first polygonal opening 1315 may be a hexagon. Optionally, the first polygonal opening 1315 may have any other shape, and the shape of the first polygonal opening 1315 is not limited in the present application. The shape of the rear end 1322 of the second output shaft 132 may be any shape that matches the first polygonal opening 1315.

Figure 9:
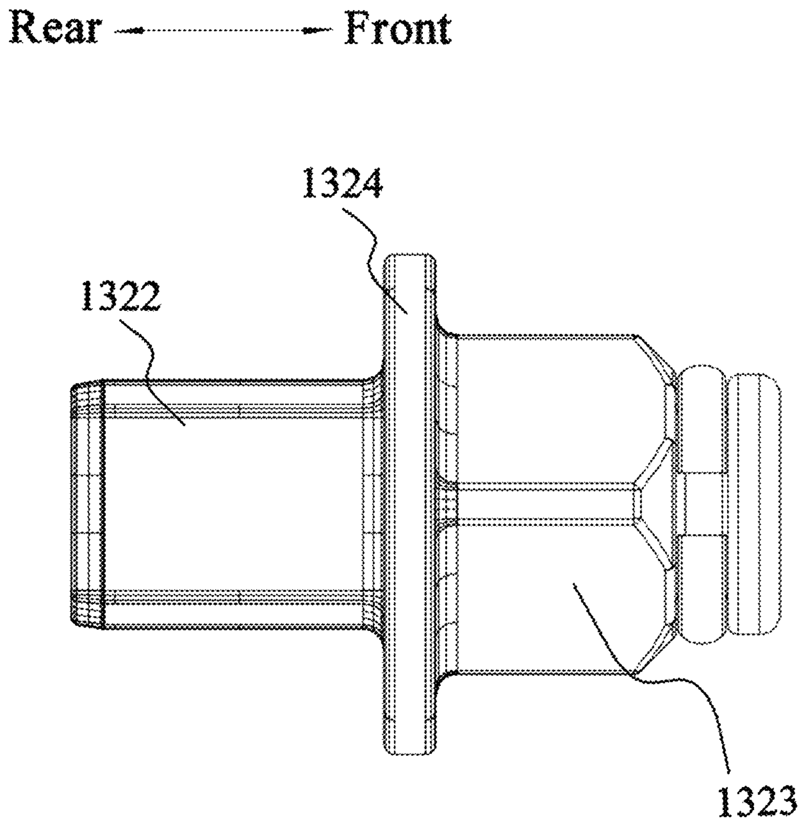
FIG. 9 is a side view of a second output shaft including an axial positioning portion according to an example.

In some examples, as shown in FIGS. 6 and 9, the front end 1323 of the second output shaft 132 is configured as a shaft in the shape of a square column so that the front end 1323 can be mounted with and mate with the tool accessory 300. To mate with the tool accessory 300, the front end 1323 of the second output shaft 132 is always the shaft in the fixed shape of a square column. Optionally, the front end 1323 of the second output shaft 132 and the rear end 1322 of the second output shaft 132 may have the same shape. That is, as shown in FIG. 6, the axial shape of the second output shaft 132 remains constant. Optionally, the front end 1323 of the second output shaft 132 and the rear end 1322 of the second output shaft 132 may have different shapes. That is, as shown in FIG. 9, the axial shape of the second output shaft 132 changes.

In some examples, as shown in FIG. 9, an axial positioning portion 1324 is disposed on the second output shaft 132. The axial positioning portion 1324 is axially disposed around the second output shaft 132 to axially position the tool accessory 300. Thus, when mounted on the second output shaft 132, the tool accessory 300 does not move back and forth on the second output shaft 132.

In some examples, when the first polygonal opening 1315 is a quadrilateral opening, the diagonal of the quadrilateral opening is substantially parallel or substantially perpendicular to the axis of the first output shaft 131. Optionally, the angle A between a side of the quadrilateral opening and a second end tooth 1312 is 45 degrees.

In some examples, when the rear end 1322 of the second output shaft 132 may be accommodated in the first polygonal opening 1315, an axial partially nested region M is included between the first output shaft 131 and the second output shaft 132. Optionally, the length of the nested region M is greater than or equal to 3 mm. Optionally, the length of the nested region M is greater than or equal to 5 mm. Optionally, the length of the nested region M is greater than or equal to 8 mm. Optionally, the length of the nested region M is 4.3 mm. Optionally, the length of the nested region M is 6.5 mm. Optionally, the length of the nested region M is 10.5 mm. Optionally, the length of the nested region M is 10.9 mm. The length of the nested region M is configured to be greater than or equal to 3 mm so that the second output shaft 132 has a sufficiently long space within the first output shaft 131. Thus, the second output shaft 132 can be stably connected within the first output shaft 131, thereby reducing the probability that the second output shaft 132 is detached from the first output shaft 131. Additionally, when the first output shaft 131 and the second output shaft 132 have relatively small sizes, the nested region M is configured to be greater than or equal to 3 mm. Thus, the problem is avoided that the first output shaft 131 and second output shaft 132 have the relatively small sizes but the nested region M is excessively large.

In some examples, as shown in FIG. 7, the maximum radial length N of the nested region M is greater than or equal to 6 mm and less than or equal to 45 mm. Optionally, the maximum radial length N of the nested region M is greater than or equal to 15 mm and less than or equal to 45 mm. Optionally, the maximum radial length N of the nested region M may be 8 mm. Optionally, the maximum radial length N of the nested region M may be 20.5 mm. Optionally, the maximum radial length N of the nested region M may be 28 mm. Optionally, the maximum radial length N of the nested region M may be 33 mm. The minimum value of the maximum radial length N of the nested region M is configured to be 6 mm so that the first output shaft 131 and the second output shaft 132 are sufficiently hard and strong when having the sufficiently small radial lengths. Thus, the risk is reduced that the first output shaft 131 and the second output shaft 132 are prone to be broken by impact due to excessively small maximum radial lengths N. The maximum value of the maximum radial length N of the nested region M is configured to be 45 mm. Thus, the problem is avoided that the entire impact wrench 100 has an excessively large size due to excessively large sizes of the first output shaft 131 and the second output shaft 132.

In some examples, the moment of inertia of each of the first output shaft 131 and the second output shaft 132 is greater than or equal to 3 $kg \cdot mm^2$, thereby increasing the matchability with which the transmission mechanism 140 of the impact wrench 100 transmits the torque to the output mechanism 130. In addition, the sizes of the first output shaft 131 and the second output shaft 132 are limited to an appropriate range to a certain degree. Optionally, the moment of inertia of each of the first output shaft 131 and the second output shaft 132 is 3.5 $kg \cdot mm^2$. Optionally, the moment of inertia of each of the first output shaft 131 and the second output shaft 132 is 3.8 $kg \cdot mm^2$. Optionally, the moment of inertia of each of the first output shaft 131 and the second output shaft 132 is 4.3 $kg \cdot mm^2$.

Figure 10:
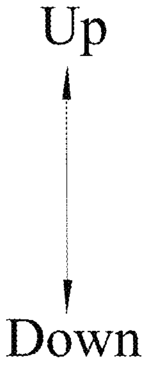
FIG. 10 is a sectional view of a first output shaft and a second output shaft each having three hardnesses.
Figure 10:
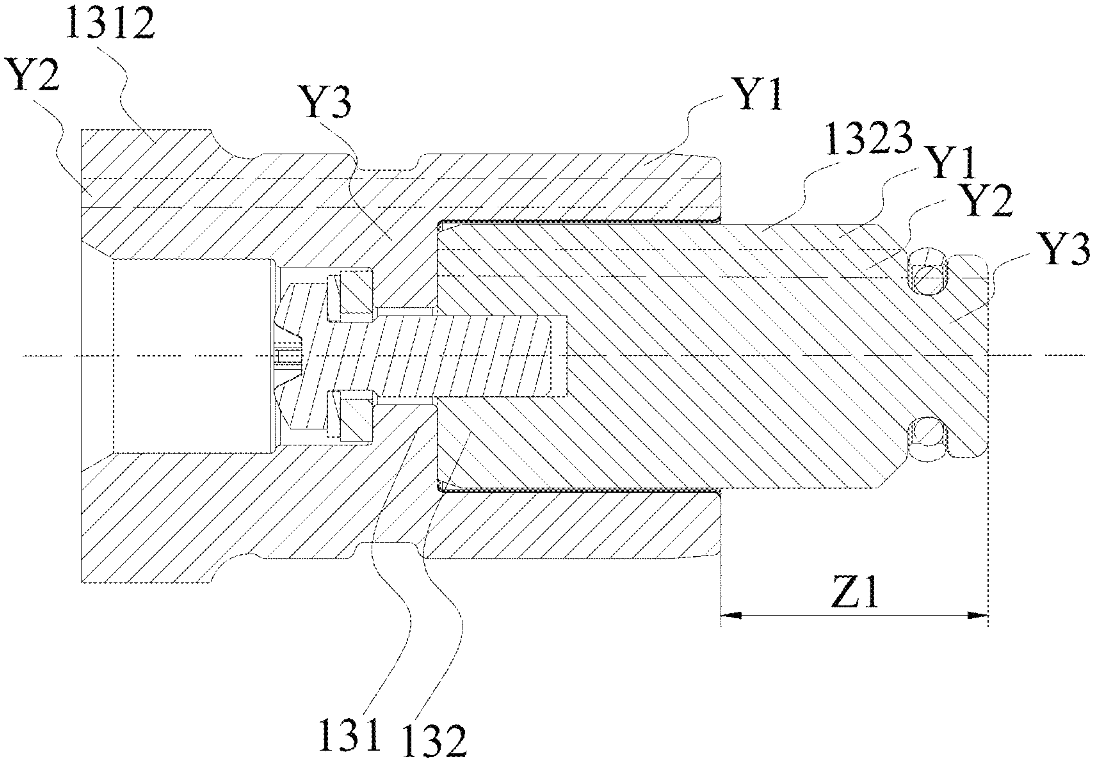

In some examples, the first output shaft 131 and the second output shaft 132 each have three hardnesses. At least part of the surface layer Y1 of the first output shaft 131 and/or the second output shaft 132 has a first hardness. The core region Y3 of the first output shaft and/or the second output shaft has a second hardness. The intermediate region Y2 between the surface layer and core region of the first output shaft and/or the second output shaft has a third hardness. The first hardness is greater than the second hardness, and the third hardness is less than the second hardness. That is, the first hardness of the surface layer Y1 is the highest, the third hardness of the intermediate region Y2 is the lowest, and the second hardness of the core region Y3 is between the first hardness and the third hardness. The core region Y3 of each of the first output shaft 131 and the second output shaft 132 refers to the central region of each of the first output shaft 131 and the second output shaft 132. Optionally, as shown in FIG. 10, the present application indicates the surface layer Y1, the intermediate region Y2, and the core region Y3 using the region above the central axis of each of the first output shaft 131 and the second output shaft 132 as an example. The region below the central axis is configured to be symmetric with respect to the region above the central axis. Optionally, the first hardness of the first output shaft 131 and the first hardness of the second output shaft 132 may be the same as or different from each other. Similarly, the second hardness of the first output shaft 131 and the second hardness of the second output shaft 132 may be the same as or different from each other, and the third hardness of the first output shaft 131 and the third hardness of the second output shaft 132 may be the same as or different from each other, which is not limited in the present application.

In some examples, the region within 0.8 mm radially from the outer surface of the first output shaft 131 and/or the second output shaft 132 may be defined as the surface layer Y1, the region from 0.8 mm to 1.5 mm radially from the outer surface of the first output shaft 131 and/or the second output shaft 132 may be defined as the intermediate region Y2, and the region beyond 1.5 mm radially from the outer surface of the first output shaft 131 and/or the second output shaft 132 may be defined as the core region Y3. In addition, other distances may be defined as the criteria for dividing the surface layer Y1, the intermediate region Y2, and the core region Y3, which is not limited in the present application. Optionally, the criteria for dividing the surface layer Y1, intermediate region Y2, and core region Y3 of the first output shaft 131 and the criteria for dividing the surface layer Y1, intermediate region Y2, and core region Y3 of the second output shaft 132 may be the same as or different from each other.

Figure 11:
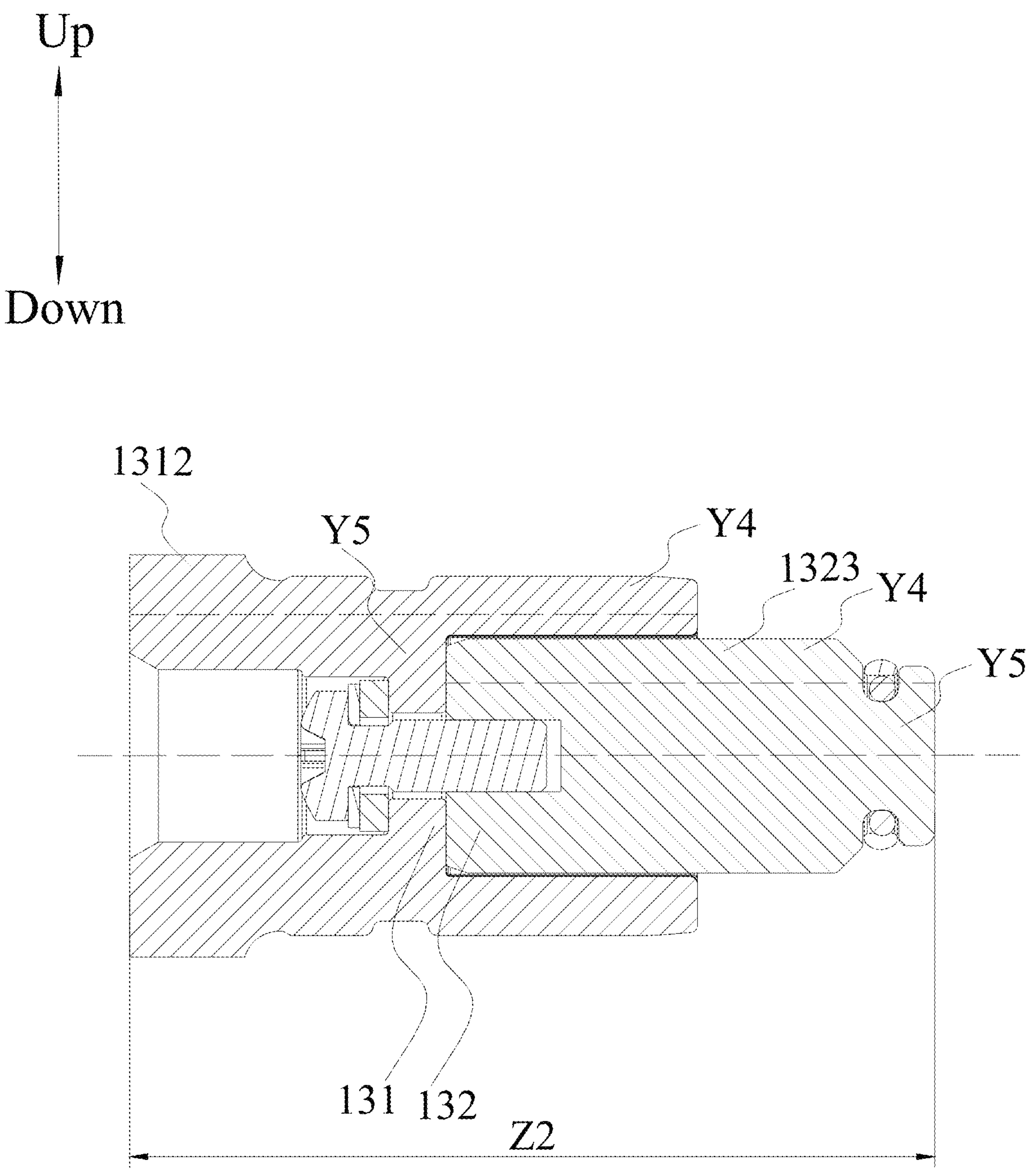
FIG. 11 is a sectional view of the first output shaft and the second output shaft in FIG. 10 each having two hardnesses.

In some examples, the first output shaft 131 and the second output shaft 132 each have two hardnesses. At least part of the surface layer Y4 of the first output shaft 131 and/or the second output shaft 132 has a fourth hardness, and the core region Y5 of the first output shaft 131 and/or the second output shaft 132 has a fifth hardness. The fourth hardness is greater than the fifth hardness. The core region Y5 refers to the region excluding the surface layer Y4. Optionally, as shown in FIG. 11, the present application indicates the surface layer Y4 and the core region Y5 using the region above the central axis of each of the first output shaft 131 and the second output shaft 132 as an example. The region below the central axis is configured to be symmetric with respect to the region above the central axis.

In some examples, the region within 2 mm radially from the outer surface of the first output shaft 131 and/or the second output shaft 132 may be defined as the surface layer Y4, and the region beyond 2 mm radially from the outer surface of the first output shaft 131 and/or the second output shaft 132 may be defined as the core region Y5. In addition, other distances may be defined as the criteria for dividing the surface layer Y4 and the core region Y5, which is not limited in the present application. Optionally, the criteria for dividing the surface layer Y4 and core region Y5 of the first output shaft 131 and the criteria for dividing the surface layer Y4 and core region Y5 of the second output shaft 132 may be the same as or different from each other. Optionally, the fourth hardness of the first output shaft 131 and the fourth hardness of the second output shaft 132 may be the same as or different from each other. Similarly, the fifth hardness of the first output shaft 131 and the fifth hardness of the second output shaft 132 may be the same as or different from each other, which is not limited in the present application.

In some examples, the first output shaft 131 has three hardnesses, and the second output shaft 132 has two hardnesses. In some examples, the first output shaft 131 has two hardnesses, and the second output shaft 132 has three hardnesses.

In some examples, when the first output shaft 131 has the three hardnesses, the hardness of the surface layer Y1 of the second end tooth 1312 of the first output shaft 131 is greater than the hardness of the surface layer Y1 of the other regions of the first output shaft 131 in the axial direction of the first output shaft 131. That is, in this case, the surface layer Y1 of the first output shaft 131 has two hardnesses. The surface layer Y1 of the second end tooth 1312 has a hardness B1, and the surface layer Y1 of the other regions of the first output shaft 131 has a hardness B2, where the hardness B1 is greater than the hardness B2. Similarly, when the first output shaft 131 has the two hardnesses, the hardness of the surface layer Y4 of the second end tooth 1312 of the first output shaft 131 is greater than the hardness of the surface layer Y4 of the other regions of the first output shaft 131. The specific hardness division is similar to that of the surface layer Y1. The details are not repeated here. In addition, in some examples, the axial thickness of the second end tooth 1312 is greater than or equal to 4 mm. Optionally, the axial thickness of the second end teeth 1312 is 4.8 mm. Optionally, the axial thickness of the second end teeth 1312 is 5 mm. Optionally, the axial thickness of the second end teeth 1312 is 6 mm.

In some examples, when the second output shaft 132 has the three hardnesses, the hardness of the surface layer Y1 of the front end 1323 of the second output shaft 132 is greater than the hardness of the surface layer Y1 of the other regions of the second output shaft 132 in the axial direction of the second output shaft 132. That is, in this case, the surface layer Y1 of the second output shaft 132 has two hardnesses. The surface layer Y1 of the second output shaft 132 has a hardness C1, and the surface layer Y1 of the other regions of the second output shaft 132 has a hardness C2, where the hardness C1 is greater than the hardness C2. Similarly, when the second output shaft 132 has the two hardnesses, the hardness of the surface layer Y4 of the front end 1323 of the second output shaft 132 is greater than the hardness of the surface layer Y4 of the other regions of the second output shaft 132. The specific hardness division is similar to that of the surface layer Y1. The details are not repeated here.

The hardness of the surface layer of the second end tooth 1312 of the first output shaft 131 is greater than the hardness of the surface layer of the other regions of the first output shaft 131. Therefore, the surface layer of the second end tooth 1312 is relatively hard and the second end tooth 1312 is relatively thick axially so that the second end tooth 1312 is less prone to break when impacted by the impact member 150. The hardness of the surface layer of the front end 1323 of the second output shaft 132 is greater than the hardness of the surface layer of the other regions of the second output shaft 132. Therefore, when the front end 1323 is connected to the tool accessory 300, the joint between the front end 1323 and the tool accessory 300 is relatively hard. Thus, the risk is reduced that the surface layer of the front end 1323 breaks when the tool accessory 300 is subjected to the reaction force during impact.

In some examples, the size range of the second output shaft 132 may be from one-quarter inch (¼ inch) to two and a half inches (2½ inches). It could be understood that the size of the second output shaft 132 refers to a length of the side of the square column when the front end 1323 is the square column. For example, the size of the second output shaft 132 can be designed as drive sizes of ¼ inch, ⅜ inch, 7/16 inch, ½ inch, ¾ inch, 1 inch, 1½ inches, and 2½ inches. It is to be understood that these drive sizes are examples. The size of the second output shaft 132 is not limited to any size in metric and/or imperial units. As shown in FIG. 10, when the size of the second output shaft 132 is ¼ inch, the axial length Z1 of the second output shaft 132 outside the first output shaft 131 is greater than or equal to 8 mm. When the size of the second output shaft 132 is ⅜ inch, the axial length Z1 of the second output shaft 132 outside the first output shaft 131 is greater than or equal to 11 mm. When the size of the second output shaft 132 is ½ inch, the axial length Z1 of the second output shaft 132 outside the first output shaft 131 is greater than or equal to 15 mm. When the size of the second output shaft 132 is greater than or equal to ¾ inch, the axial length Z1 of the second output shaft 132 outside the first output shaft 131 is greater than or equal to 20 mm. Thus, when the second output shaft 132 has various sizes, the axial length Z1 for the second output shaft 132 to mate with the working accessory 300 can be relatively great, thereby improving the stability with which the working accessory 300 is mounted to the second output shaft 132 for work.

In some examples, as shown in FIG. 11, when the size of the second output shaft 132 is ¼ inch, the axial length Z2 of the first output shaft 131 and the second output shaft 132 that are assembled is greater than or equal to 20 mm. When the size of the second output shaft 132 is ⅜ inch, the axial length Z2 of the first output shaft 131 and the second output shaft 132 that are assembled is greater than or equal to 25 mm. When the size of the second output shaft 132 is greater than or equal to ½ inch, the axial length Z2 of the first output shaft 131 and the second output shaft 132 that are assembled is greater than or equal to 30 mm. Thus, when the second output shaft 132 has the various sizes, the axial length Z2 of the first output shaft 131 and the second output shaft 132 that are assembled is within an appropriate range, further causing the overall axial length of the impact wrench 100 to be within an appropriate range.

In some examples, the impact wrench 100 further includes a lubrication assembly. The lubrication assembly includes a lubrication channel at least provided within the first output shaft 131 and the second output shaft 132. The lubrication channel includes an opening that communicates with the outside of the impact wrench 100. Thus, the user can inject a lubricant through the opening for lubrication to reduce the wear on the first output shaft 131 and the second output shaft 132 and the heat generated when the first output shaft 131 and the second output shaft 132 are impacted.

In some examples, the first output shaft 131 and the second output shaft 132 are caused to have impact toughness through reliable forging and hardening. Optionally, the first output shaft 131 and the second output shaft 132 are forged from alloy steel. Optionally, the first output shaft 131 and the second output shaft 132 are forged from alloy steel including chromium or nickel. Optionally, the first output shaft 131 and the second output shaft 132 may be made from other metals which have appropriate toughness and can be hardened. In some examples, after being forged, the first output shaft 131 and the second output shaft 132 are carburized, quenched, and tempered to obtain the different hardnesses described above in the present application, such as the hardness of the surface layer, the hardness of the intermediate region, and the hardness of the core region. Optionally, quenching may be performed with a carburizing and quenching method. Optionally, quenching may be performed with an induction quenching method. Optionally, quenching may be performed with laser quenching. Additionally, quenching may be performed with any other method capable of causing the hardness of the surface layer to be greater than the hardness of the core region. The quenching method is not limited in the present application. In some examples, the quenching processes for the first output shaft 131 and the second output shaft 132 may be the same as or different from each other. The hardness of the surface layer of each of the first output shaft 131 and the second output shaft 132 is caused to be greater than the hardness of the core region of each of the first output shaft 131 and the second output shaft 132. That is, the surface layer is harder than the core region. Thus, the first output shaft 131 and the second output shaft 132 are provided with the toughness required to withstand repeated impact.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

an electric motor comprising a drive shaft rotating about a first axis;

an impact member configured to be driven by the electric motor;

a transmission mechanism disposed between the electric motor and the impact member and transmitting torque outputted by the drive shaft to the impact member;

a power supply configured to supply electrical energy to the impact tool;

an output mechanism configured to be provided with an impact force by the impact member and comprising a first output shaft driven by the impact member to rotate and a second output shaft connected to the first output shaft and retained at a front-most end of the impact tool to be mounted with a tool accessory; and a connector configured to connect the first output shaft to the second output shaft, wherein a front end surface of the first output shaft is configured as a force-bearing region bearing an impact reaction force from the tool accessory.

2. The impact tool according to claim 1, wherein a partially nested region exists between the first output shaft and the second output shaft, and a length of the nested region along a front and rear direction is greater than or equal to 3 mm.

3. The impact tool according to claim 2, wherein a maximum radial length of the nested region is greater than or equal to 6 mm and less than or equal to 45 mm.

4. The impact tool according to claim 2, wherein the length of the nested region along the front and rear direction is greater than or equal to 8 mm.

5. The impact tool according to claim 1, wherein at least a front end of the second output shaft is configured as a shaft in a shape of a square column so as to be mounted with the tool accessory.

6. The impact tool according to claim 1, wherein a buffer is disposed between the connector and the first output shaft.

7. The impact tool according to claim 1, wherein the connector comprises a screw.

8. The impact tool according to claim 1, wherein the front end surface of the first output shaft is in contact with a rear end surface of the tool accessory mounted on the second output shaft.

9. The impact tool according to claim 1, wherein at least part of a surface layer of the first output shaft and/or the second output shaft has a first hardness, a core region of the first output shaft and/or the second output shaft has a second hardness, and the first hardness is greater than the second hardness.

10. The impact tool according to claim 9, wherein an intermediate region between the surface layer and the core region has a third hardness and the third hardness is less than the second hardness.

11. The impact tool according to claim 1, wherein an axial positioning portion is disposed on the second output shaft to axially position the tool accessory.

12. The impact tool according to claim 1, wherein a size of the second output shaft is greater than or equal to one-quarter inch and less than or equal to two and a half inches.

13. An impact tool, comprising:

an electric motor comprising a drive shaft rotating about a first axis;

an impact member configured to be driven by the electric motor;

a transmission mechanism disposed between the electric motor and the impact member and transmitting torque outputted by the drive shaft to the impact member;

a power supply configured to supply electrical energy to the impact tool; and an output mechanism configured to be provided with an impact force by the impact member and comprising a first output shaft configured to rotate in response to receiving an impact force along a rotation direction of the impact member and a second output shaft connected to the first output shaft and retained at a front-most end of the impact tool to be mounted with a tool accessory;

wherein an axial partially nested region exists between the first output shaft and the second output shaft, and a length of the nested region is greater than or equal to 3 mm.

14. The impact tool according to claim 13, wherein a maximum radial length of the nested region is greater than or equal to 6 mm and less than or equal to 45 mm.

15. The impact tool according to claim 13, wherein an axial positioning portion is disposed on the second output shaft to axially position the tool accessory.

16. The impact tool according to claim 13, wherein a hardness of a surface of the first output shaft and/or the second output shaft is greater than a hardness of a core of the first output shaft and/or the second output shaft.

17. The impact tool according to claim 16, wherein a hardness of an intermediate region between the surface and the core is less than the hardness of the core.

18. An impact tool, comprising:

an electric motor comprising a drive shaft rotating about a first axis;

an impact member configured to be driven by the electric motor;

a transmission mechanism disposed between the electric motor and the impact member and transmitting torque outputted by the drive shaft to the impact member;

a power supply configured to supply electrical energy to the impact tool; and an output mechanism configured to be provided with an impact force by the impact member and comprising a first output shaft driven by the impact member to rotate and a second output shaft connected to the first output shaft and retained at a front-most end of the impact tool to be mounted with a tool accessory, wherein a front end surface of the first output shaft is configured as a force-bearing region bearing an impact reaction force from the tool accessory, and wherein the front end surface of the first output shaft is formed with a first polygonal opening, a shape of at least a rear end of the second output shaft matches a shape of the first polygonal opening, and the rear end of the second output shaft is accommodated in the first polygonal opening.

19. The impact tool according to claim 18, wherein the first polygonal opening is a quadrilateral opening, and a diagonal of the quadrilateral opening is substantially parallel or substantially perpendicular to an axis of the first output shaft.

* * * * *